United States Patent
De Haas

(10) Patent No.: US 12,078,142 B2
(45) Date of Patent: Sep. 3, 2024

(54) TURBINE WITH SECONDARY ROTORS

(71) Applicant: EQUINOX OCEAN TURBINES B.V., Jorwert (NL)

(72) Inventor: Pieter Daniël De Haas, Jorwert (NL)

(73) Assignee: Equinox Ocean Turbines B.V., Jorwert (NL)

( * ) Notice: Subject to any disclaimer, the term of this patent is extended or adjusted under 35 U.S.C. 154(b) by 0 days.

(21) Appl. No.: 17/921,824

(22) PCT Filed: May 7, 2021

(86) PCT No.: PCT/NL2021/050296
§ 371 (c)(1),
(2) Date: Oct. 27, 2022

(87) PCT Pub. No.: WO2021/225441
PCT Pub. Date: Nov. 11, 2021

(65) Prior Publication Data
US 2023/0175473 A1 Jun. 8, 2023

(30) Foreign Application Priority Data

May 8, 2020 (NL) .................................. 2025538

(51) Int. Cl.
*F03D 1/02* (2006.01)
*F03D 1/06* (2006.01)
*F03D 3/06* (2006.01)

(52) U.S. Cl.
CPC .............. *F03D 1/02* (2013.01); *F03D 1/0675* (2013.01); *F03D 3/064* (2013.01); *F05B 2210/16* (2013.01); *F05B 2240/374* (2020.08)

(58) Field of Classification Search
CPC .......... F03D 1/02; F03D 1/0675; F03D 3/064; F05B 2210/16; F05B 2240/374; Y02E 10/30; Y02E 10/72; Y02E 10/74
See application file for complete search history.

(56) References Cited

U.S. PATENT DOCUMENTS

| 2,501,696 A | 3/1950 | Souczek |
| 3,209,156 A | 9/1965 | Struble, Jr. |

(Continued)

FOREIGN PATENT DOCUMENTS

| DE | 3527951 A1 | 2/1987 | |
| EP | 1577546 A2 * | 9/2005 | ............... F03D 1/02 |

(Continued)

OTHER PUBLICATIONS

"International Search Report and Written Opinion Received for PCT Patent Application No. PCT/US2023/068461, on Sep. 29, 2023", 9 pages.

*Primary Examiner* — Joseph Ortega
(74) *Attorney, Agent, or Firm* — Ballard Spahr LLP

(57) ABSTRACT

The invention relates to a turbine comprising a primary rotor, for positioning in a fluid flow, having a primary rotor blade rotatable around a primary rotor axis under influence of the fluid flow acting on the primary rotor blade and extending from the primary rotor axis along a longitudinal axis to a free outer end of the primary rotor blade. The primary rotor blade is provided near the free outer end with a secondary rotor. The secondary rotor has a secondary rotor blade rotatable around a secondary rotor axis in response to a rotation of the primary rotor blade around the primary rotor axis. The secondary rotor axis is substantially transverse to the longitudinal axis of the primary rotor blade. The secondary rotor axis is also substantially transverse to the primary rotor axis. The turbine is characterised in that the secondary rotor axis is positioned offset from the longitudinal axis of the primary rotor blade.

15 Claims, 3 Drawing Sheets

(56) References Cited

U.S. PATENT DOCUMENTS

| | | |
|---|---|---|
| 4,917,332 A | 4/1990 | Patterson, Jr. |
| 5,151,610 A | 9/1992 | St-Germain |
| 6,263,971 B1 | 7/2001 | Giannesini |
| 7,270,214 B1 | 9/2007 | Tonnessen et al. |
| 7,737,570 B2 | 6/2010 | Costin |
| 8,421,260 B2 | 4/2013 | Duke |
| 9,440,718 B1 | 9/2016 | Tang |
| 9,709,024 B2 | 7/2017 | Duke |
| 10,518,595 B2 | 12/2019 | Dietrich |
| 11,371,481 B2 | 6/2022 | Duquette et al. |
| 2007/0241566 A1 | 10/2007 | Kuehnle |
| 2009/0058090 A1 | 3/2009 | Henriksen |
| 2009/0196748 A1 | 8/2009 | Salter |
| 2009/0230686 A1 | 9/2009 | Catlin |
| 2010/0181774 A1 | 7/2010 | Dehlsen et al. |
| 2011/0095530 A1 | 4/2011 | Blumer et al. |
| 2011/0176915 A1 | 7/2011 | Keir et al. |
| 2012/0292911 A1 | 11/2012 | Bolin |
| 2013/0127173 A1 | 5/2013 | Lee et al. |
| 2014/0308111 A1 | 10/2014 | Duke |
| 2016/0027308 A1 | 1/2016 | Hine |
| 2016/0138554 A1 | 5/2016 | Hawthorne |
| 2017/0089322 A1 | 3/2017 | Liu et al. |
| 2018/0298877 A1* | 10/2018 | Hoffmann ............ F03D 1/0658 |
| 2019/0040840 A1 | 2/2019 | Rohrer |
| 2020/0088157 A1 | 3/2020 | Meason et al. |
| 2020/0088158 A1 | 3/2020 | Duquette et al. |
| 2022/0325688 A1 | 10/2022 | Duquette et al. |

FOREIGN PATENT DOCUMENTS

| | | |
|---|---|---|
| FR | 2464384 A1 | 3/1981 |
| GB | 211766 | 2/1924 |
| KR | 100839485 B1 | 6/2008 |
| WO | 2009/084870 A2 | 7/2009 |

\* cited by examiner

TURBINE WITH SECONDARY ROTORS

CROSS-REFERENCE TO RELATED APPLICATIONS

This application is a U.S. National Phase Application of International Application No. PCT/NL2021/050296, filed May 7, 2021, which claims priority to NL Application No. 2025538, filed May 8, 2020, the entire contents of each of which are hereby incorporated herein by reference in their entirety.

FIELD OF THE INVENTION

The invention generally relates to a turbine for converting kinetic energy of a fluid flow, such as wind or moving water, into rotational energy of a rotor of the turbine. More particular, the invention relates to an underwater turbine, such as a tidal stream turbine or ocean current turbine.

BACKGROUND OF THE INVENTION

Traditional turbines for converting kinetic energy of a fluid flow usually comprise a primary rotor, for positioning in the fluid flow, having one or more primary rotor blades that are rotatable around a primary rotor axis. In use the flowing fluid acts on the primary rotor blades to induce a rotation about the primary rotor axis. A power take-off system is arranged at the primary rotor axis for converting the rotational energy of the primary rotor into usable electric energy. The power take-off system typically includes an electric generator that is connected to the primary rotor axis through a mechanical transmission that converts the relatively slow rotational speed and high torque of the primary rotor axis to a relatively high rotational speed required for the electric generator. In some systems, a high torque generator is directly coupled to the primary rotor axis, without interposition of a transmission.

The traditional power take-off systems, in particular their transmissions or high torque generators, contribute significantly to the overall weight, cost, and complexity of construction of the turbine. An alternative turbine is therefore known with each of the primary rotor blades provided at their free outer tip with a secondary rotor. As the secondary rotors are subject to the relatively high rotational speed of the primary rotor at the blade outer tip, the secondary rotors already operate at high rotational speeds, which allows for a compact low-cost power take-off at the secondary rotors. Even a direct coupling between the secondary rotor and a respective electric generator may be realized, obviating the need for a transmission or high torque generator as used in the traditional turbines.

Known turbines, and particularly a turbine with secondary rotors, are often provided with an active pitch control system for controlling the operation of the turbine, particularly the primary rotor speed, by adapting the pitch angle of the primary rotor blades in the fluid flow. This allows the turbine to mitigate the effects of extremes in the fluid flow velocity on the turbine blades, particularly to prevent the primary rotor from "running away", i.e. continuously increasing its power output at a continuously increasing fluid flow velocity. The active pitch control systems are, however, complex and require vulnerable mechanical and delicate electrical components, adding to the complexity and overall construction and maintenance costs of the turbine, which, particularly for difficult to reach turbines, such as offshore wind turbines and underwater turbines, can be a significant drawback.

SUMMARY OF THE INVENTION

It is therefore an aim of the invention to provide an improved turbine, particularly a turbine comprising a passive control mechanism for mitigating extremes and fluctuations in the fluid flow velocity. More particular, it is an aim to provide a turbine with a passive pitch and/or twist mechanism that is low on maintenance. It is further an aim to provide a cost effective turbine on both manufacturing and maintenance costs. A particular aim is to provide a turbine for converting kinetic energy of moving water into rotational energy of a rotor of the turbine, for example an underwater turbine, such as a tidal stream turbine or ocean current turbine, having a passive control mechanism for mitigating extremes and fluctuations in the water flow velocity.

Accordingly, in an aspect there is provided a turbine comprising a primary rotor, for positioning in a fluid flow, having a primary rotor blade rotatable around a primary rotor axis under influence of the fluid flow acting on the primary rotor blade and extending from the primary rotor axis along a longitudinal axis to a free outer end of the primary rotor blade. The primary rotor blade is provided near its free outer end with a secondary rotor. The secondary rotor has a secondary rotor axis with a secondary rotor blade that is rotatable around the secondary rotor axis in response to a rotation of the primary rotor blade around the primary rotor axis. The secondary rotor axis is substantially transverse to the longitudinal axis of the primary rotor blade, and also substantially transverse to the primary rotor axis. The secondary rotor axis is moreover positioned offset from the longitudinal axis of the primary rotor blade.

This arrangement and positioning of the secondary rotor near the free outer end of the primary rotor blade in the turbine renders the secondary rotor to face a direction of rotation of the primary rotor blade, i.e. the secondary rotor axis substantially coincides with a direction of travel of the free outer end of the primary rotor blade, wherein a rotation of the primary rotor blade around the primary rotor axis induces a thrust on the secondary rotor. Due to the offset positioning of the secondary rotor with respect to the longitudinal axis of the primary rotor blade, the thrust on the secondary rotor in return creates a torsional moment on the primary rotor blade around its longitudinal axis. The torsional moment, being proportional to the thrust on the secondary rotor and an offset distance between the secondary rotor axis and the longitudinal axis of the primary rotor blade, may twist and/or pivot the primary rotor blade, at least locally, around its longitudinal axis to alter a twist and/or pitch angle of the primary rotor blade. As the thrust is a function of the rotation speed of the primary rotor which rotation speed is determined by the fluid flow speed, the offset distance in the turbine may be configured and arranged to be adequate given a threshold fluid flow speed, i.e. a minimal fluid flow speed, acting on the primary rotor in use of the turbine to provide an at least local change in pitch and/or twist angle in the primary rotor blade that affects the angle of attack of the primary rotor blade with respect to the fluid flow if the threshold fluid flow speed is exceeded. As the change in angle of attack of the primary rotor blade with respect to the fluid flow in turn affects the rotational speed of the primary rotor, i.e. a less than optimal angle of attack lowers the rotation speed, changes in the fluid flow speed are to at least some extent mitigated with respect to a corresponding rotational speed of the primary rotor. Accordingly, the offset positioned secondary rotor enables a passive control on the primary rotor speed, thus obviating a need for rather complex and costly active pitch control system.

In an aspect the turbine comprises the secondary rotor at or adjacent the free outer end of the primary rotor blade. For example the secondary rotor may be directly assembled or otherwise coupled to the outer end, i.e. the tip portion, of the primary rotor blade. However, the secondary rotor may also be provided near the free outer end of the primary rotor blade, e.g. at some distance from the outermost tip. For example the secondary rotor may be coupled to the primary rotor blade somewhere between the primary rotor axis and the free outer end of the primary rotor blade. It will be understood that a positioning of the secondary rotor near to the free outer end of the primary rotor blade will provide a sufficient local rotational speed of the primary rotor blade acting on the secondary rotor to enable the secondary rotor to function as an efficient power take-off.

In an aspect the turbine may comprise the secondary rotor at least in part integrally connected to the primary rotor blade. For example a bridging part may be provided between the primary rotor blade and the secondary rotor axis, which bridging part is formed in one piece with the primary rotor blade, e.g. a curved segment extending from the primary rotor blade near the free outer end thereof, and/or in one piece with the secondary rotor. Alternatively the primary rotor and secondary rotor may be formed as separate elements which are assembled together after forming thereof. For example the secondary rotor may be coupled to the primary rotor blade by means of suitable coupling means, e.g. mechanical couplers, particularly screw means, clamping means, snap means or other suitable means for a reliable attachment of the secondary rotor to the primary rotor blade.

The turbine comprises at least one rotor blade, for example two or more primary rotor blades, such as three, four or five primary rotor blades. Each of the primary rotor blades may be provided with a secondary rotor, but it also possible that only part of the primary rotor blades is provided with a secondary rotor. It will also be appreciated that a primary rotor blade may be provided with multiple secondary rotors, such as two or three secondary rotors.

The primary rotor blade may have an upstream-facing side facing upstream in the fluid flow, and a downstream-facing side opposite the upstream-facing side, wherein the secondary rotor axis is positioned at an offset upstream from the longitudinal axis. Here, a thrust on the secondary rotor will induce a torsional moment on the primary rotor blade, about its longitudinal axis, or an axis parallel thereto, that could twist and/or pitch the primary rotor blade to a more feathered position, i.e. in a direction towards a position in which the primary rotor blade is substantially parallel to the fluid flow direction. This way, the load on the primary rotor blade is reduced and as a consequence the primary rotor speed will be reduced.

The primary rotor blade may be arranged to pivot and/or twist substantially about its longitudinal axis, or an axis parallel thereto, under influence of a thrust force of the secondary rotor acting on the primary rotor blade. In use, the pitch or twist angle of the primary rotor blade will settle at an equilibrium point where the primary rotor speed and the secondary rotor thrust are balanced. In particular, the power output of the turbine will settle at an equilibrium where the pitch or twist angle, the primary rotor speed and the secondary rotor thrust are balanced. The primary rotor blade may be pitched and/or twisted in its entirety, or locally, for example at a predefined section and/or segments of the primary rotor blade. Twisting of the primary rotor blade may for example be established by elastic deformation of the material of the primary rotor blade. Pivoting of the primary rotor blade may not involve substantial elastic or plastic deformation of the material that makes up the primary rotor blade. The primary rotor blade may for example pivot as a whole about the longitudinal axis. Alternatively, the primary rotor blade could include several segments that are arranged to pivot relative to each other, for example a tip section that could pivot relatively to a root segment of the primary rotor blade. The segments may be joint to each other by means of resilient bridges, such as rubber buffer segments. Fluctuations in the fluid flow velocity, e.g. sudden increases and decreases in the fluid flow velocity, can accordingly be mitigated by the secondary rotor thrust in combination with the induced torsional moment on the primary rotor blade that pivots and/or twists the primary rotor blade.

The turbine may be arranged such that a substantially less than cubic relations, e.g. square, linear, or other, is obtained between the fluid flow velocity and the power output of the turbine. Optionally, the turbine is arranged so as to obtain a substantially less than square relation, e.g. linear, or other, between the fluid flow velocity and the main rotor thrust.

The primary rotor blade may be arranged to pivot and/or twist under influence of a thrust force of the secondary rotor acting on the primary rotor blade exceeding a predetermined threshold value.

Optionally, the secondary rotor is fixedly connected to the primary rotor blade near the free outer end of the primary rotor blade in such a way that the secondary rotor axis rotationally repositions substantially about the longitudinal axis of the primary rotor blade when the primary rotor blade pivots and/or twists, to change a yaw angle of the secondary rotor. Twisting and/or pivoting of the primary rotor blade around the longitudinal axis may alter the orientation of the secondary rotor with respect to the rotation direction of the primary rotor. In other words, the approach angle of the secondary rotor may alter upon pivoting and/or twisting of the primary rotor blade, to an orientation in which the secondary rotor axis no longer coincides with the rotation direction of the primary rotor blade. This may reduce the thrust on the secondary rotors to mitigate peak power.

The primary rotor blade has a leading edge leading in a direction of rotation of the primary rotor blade and a trailing edge opposite the leading edge. Optionally the secondary rotor is arranged at or near a trailing edge of the primary rotor blade. This way the secondary rotor could harvest the tip vortex energy of the primary rotor blade. The secondary rotor may particularly be arranged in the trailing tip vortex of the primary rotor blade such that the secondary rotor rotates along with the rotation of the tip vortex. The secondary rotor could for example be arranged beyond the trailing edge, i.e. trailing behind the trailing edge of the associated primary rotor blade. The primary rotor blade could be designed so as to stimulate tip vortex losses, e.g. by increasing the load on a tip sections of the primary rotor blade. These vortex losses can be recovered by the secondary rotor, thus achieving a higher efficiency of the primary rotor.

Optionally, the primary rotor blade is arranged to twist about its longitudinal axis when subjected to a bending moment about a bending axis, e.g. a flatwise bending moment. The secondary rotor, being provided at or near the free outer end of the primary rotor blade, can have a significant mass associated therewith, which, under rotation of the primary rotor, creates a substantial centrifugal force on the primary rotor blade. Due to the offset positioning of the secondary rotor with respect to the primary rotor blade, the centrifugal force will induce a flatwise bending moment on the primary rotor blade, about a bending axis which is substantially transverse to the longitudinal axis and parallel with the secondary rotor axis. This bending moment is coupled to induce a torsional moment around the longitudinal axis. Consequently, this bend-twist-coupling enables the primary rotor blade to twist around the longitudinal angle, e.g. towards a more feathered position, to reduce the load on the primary rotor blade. The bend-twist coupling can for instance be established by anisotropic properties of the material of the primary rotor blade, that structurally couples bending and twist of the primary rotor blade. The bending induced torsion of the primary rotor blade may collaborate with the torsional moment induced by the secondary rotor thrust, i.e. a direction of both the torsional moments may coincide. Alternatively, the bending induced torsion of the primary rotor blade may counteract the torsional moment induced by the secondary rotor thrust, i.e. a direction of both the torsional moments may be opposite to each other. For example, the primary rotor blade comprises an anisotropic material, for enabling bend-twist-coupling of the primary rotor blade.

The bending moment may further be induced by the thrust force of the primary rotor. The fluid flow, in which the turbine is positioned, acts on the primary rotor blade and induces a (flatwise) bending moment on the primary rotor blade, that is coupled to induce a torsional moment about the longitudinal axis. The bending moment induced by the primary rotor thrust and the bending moment induced by the centrifugal force of the secondary rotor work can act concurrently on the primary rotor blade, to be coupled to induce a torsional moment around the longitudinal axis.

Optionally, the primary rotor blade comprises concrete, in particular pre-tensioned or reinforced concrete. Concrete has a high compressive strength and is relatively inexpensive and easy to manufacture. More particular, the primary turbine blade may be substantially made of concrete. The concrete can be pre-tensioned by means of pre-tension rods, for instance made of steel, titanium, carbon, Kevlar, polymer, composite, and/or other materials, so as to (pre)load the primary rotor blade on compression, to counteract the relatively low tensile strength of the concrete. The concrete could for example be pre-tensioned in a way to impose anisotropic properties to the primary rotor blade. Further, pre-tension rods are known to show a very small force ripple when loaded cyclically, and can, as such, be tensioned to yield, or to a very high loading, without jeopardising a fatigue life of the pre-tension rods and hence the primary rotor blade. The application of concrete for the construction of the primary rotor blade is particularly beneficial for underwater turbines. The primary rotor blade can be made, at least substantially, buoyant neutral so as to minimise gravitational loads on the turbine, and to facilitate installation and transportation of the primary rotor blade to a desired offshore location.

Optionally, the primary rotor blade is substantially made of multiple segments, e.g. arranged consecutively along the length of the primary rotor blade. The segments may be arranged to pivot relative to each other, and can each be made out of a different material. Optionally, the primary rotor blade comprises a fixed root segment, and a one or more tip segments that are pivotable and/or twistable relative to the fixed root segment. The root segment may be made substantially out of concrete. The one or more tip segments may be made of concrete, or any other material. The root segment may be fixed to a primary hub of the primary rotor, and could for example make up ⅔ of the length of the primary rotor blade.

The turbine optionally comprises control means arranged for controlling a pitch angle about a longitudinal axis of the secondary rotor blade of the secondary rotor blade of the secondary rotor. This way, the secondary rotor thrust, or the secondary rotor induction, may be controlled. This way the overall performance of the turbine can be controlled. The control means may be passive or active.

The secondary rotor may be provided in a duct, which duct has a duct wall extending around the secondary rotor axis and central through flow channel for guiding a flow of fluid through the duct. The duct is arranged to guide a fluid in a direction substantially along the secondary rotor axis, even when the orientation of the secondary rotor is altered due to a twist and/or pivot of the primary rotor blade.

Optionally a cross sectional area of the through flow channel of the duct varies along a length of the duct, for optimising the flow through the duct. The through flow channel of the duct for example comprises a local cross sectional narrowing and/or widening between an inlet side and an outlet side of the duct, wherein the secondary rotor is arranged in the duct at the local narrowing and/or widening, for optimising the induction of the secondary rotor. The duct may further comprise a diffuser, e.g. at an outlet side of the duct, to increase efficiency.

Optionally, the turbine comprises a flow modulation means arranged for changing the cross sectional area along the through flow channel of the duct during operation of the turbine. The cross sectional area may for example be changed in dependence of the primary rotor speed to have the secondary rotors operate optimally.

The secondary rotor may be operatively connected to an electric generator, e.g. without interposition of a mechanical transmission system.

Optionally, the duct wall includes a stator of an electric generator.

The turbine may comprise a gearless transmission for converting kinetic energy from the secondary rotor blade to electric energy.

According to another aspect of the invention is provided an energy converting device for converting kinetic energy from a fluid flow into electrical energy comprising a turbine as described herein.

Optionally, the turbine of the energy converting device is an underwater turbine for positioning in a stream of water, such as an ocean current, e.g. a unidirectional ocean current.

Optionally, the turbine of the energy converting device is a tidal turbine for positioning in a stream of water subject to tidal movements.

It will be appreciated that any one or more of the above aspects, features and options can be combined. It will be appreciated that any one of the options described in view of one of the aspects can be applied equally to any of the other aspects. It will also be clear that all aspects, features and options described in view of the turbine apply equally to the energy converting device.

BRIEF DESCRIPTION OF THE DRAWINGS

The aspects as covered by the appended claims as well as other aspects, features and advantages will be explained in further detail in the description below in reference to the accompanying drawings, in which

DETAILED DESCRIPTION

Figure 1A:
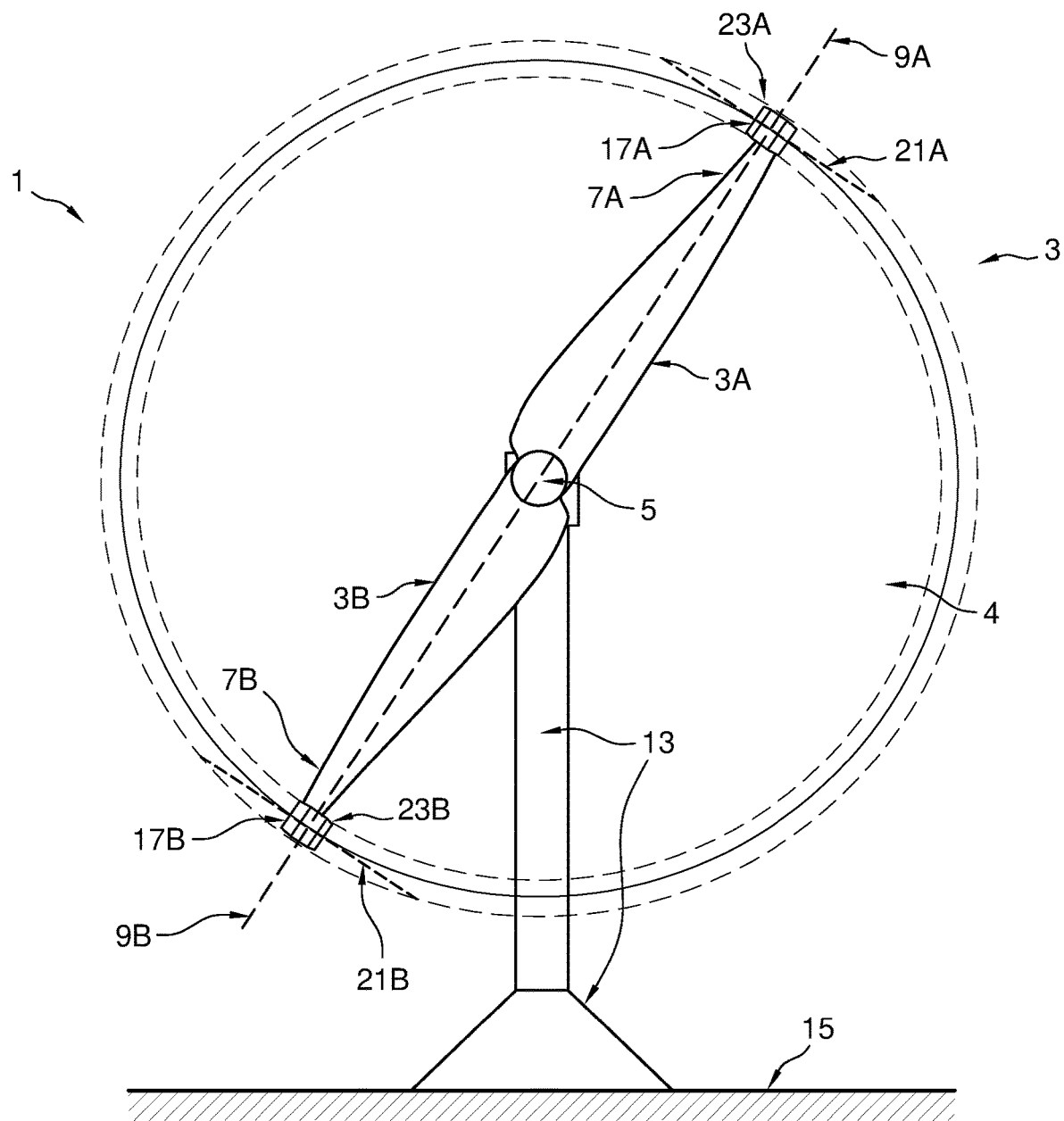
FIG. 1A shows a schematic frontal view of a turbine.
Figure 1B:
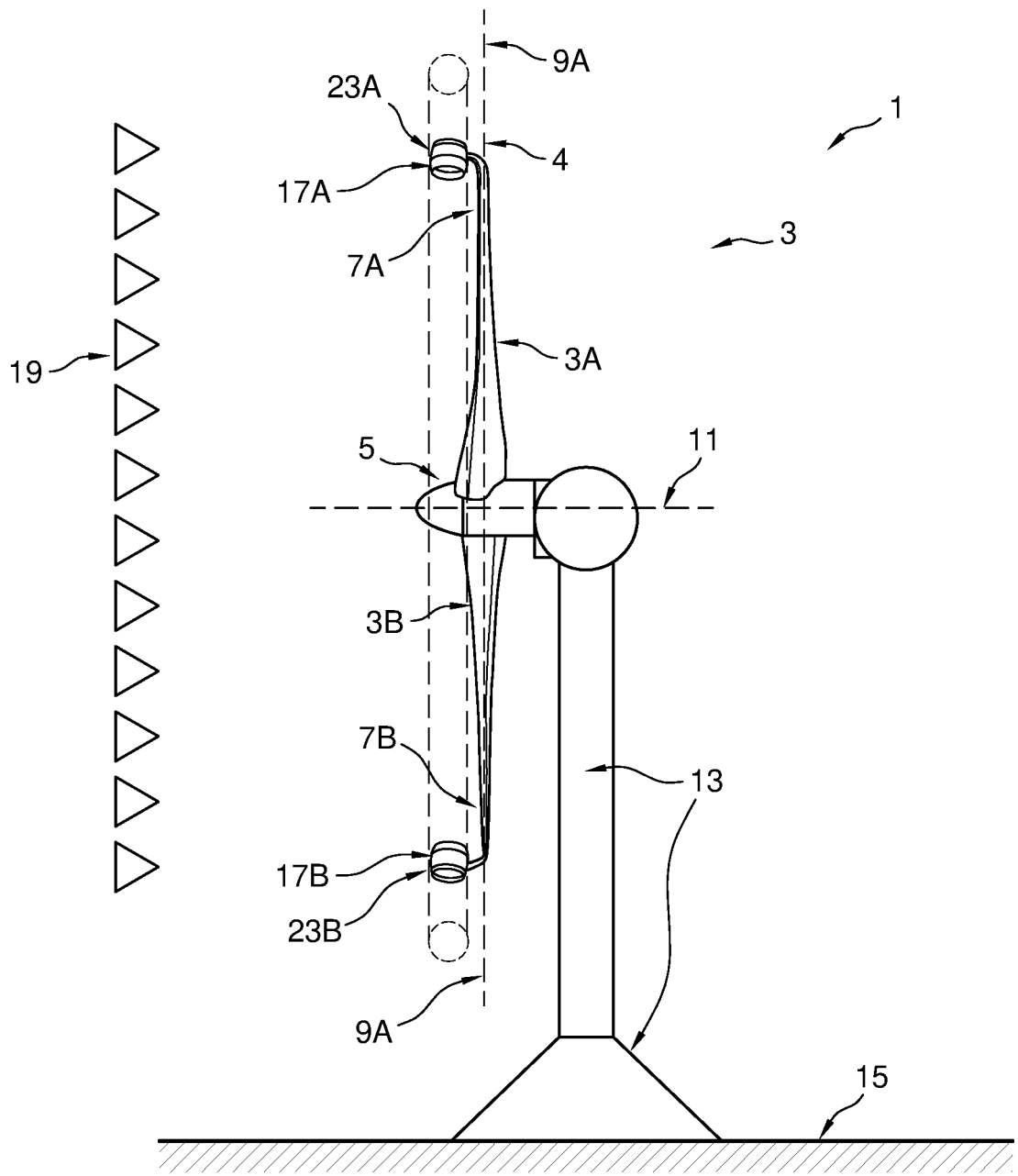
FIG. 1B shows a schematic side view of a turbine.

FIG. 1A and FIG. 1B show a schematic frontal view and side view of a turbine 1 respectively. The turbine comprises a primary rotor 3 having a primary rotor blade 3A. Here the turbine comprises two primary rotor blades 3A, 3B but it is appreciated that the turbine may comprise more than two primary rotor blades, such as three, four, five or six primary rotor blades. Each primary rotor blade 3A, 3B is mounted to a central primary hub 5, and extends outwardly from the primary hub 5 to a free outer end 7A, 7B, along a longitudinal axis 9A, 9B. The primary rotor blades 3A, 3B, and the primary hub 5, are rotatable around a horizontal primary rotor axis 11, wherein the longitudinal axis 9A, 9B of each of the primary rotor blades 3A, 3B is substantially perpendicular to the horizontal primary rotor axis 11.

In use, the turbine 1 is positioned in a fluid flow, for instance wind or a stream of water, in such a way that the primary rotor axis 11 coincides with a flow direction of the fluid flow. Interaction of the fluid flow with the primary rotor blades 3A, 3B causes the primary rotor blades 3A, 3B to rotate around the primary rotor axis 11 within a primary rotor plane 4. In FIG. 1B, the fluid flow direction is indicated by the arrows 19, in this case indicating that the fluid flow is from left to right. As such, the turbine 1 is depicted in FIG. 1A and FIG. 1B in an upstream configuration, wherein the primary rotor is positioned upstream from a founding structure 13 of the turbine 1 that supports the primary rotor from a ground surface 15, e.g. an ocean bed. It is appreciated that the turbine 1 may also be a downstream configured turbine, wherein the primary rotor is positioned downstream of the founding structure 13.

Each of the primary rotor blades 3A, 3B is provided with a secondary rotor 17A, 17B. In some embodiments, it may be appreciated to provide only part of the primary rotor blades with a secondary rotor, e.g. only one of the primary rotor blades. It may also be appreciated that a single primary rotor blade may be provided with a multiple secondary rotors. The secondary rotors 17A, 17B are provided near the free outer end 7A, 7B of its associated primary rotor blade 3A, 3B, and comprise a secondary rotor axis 21A, 21B. Each secondary rotor 17A, 17B comprises one or more secondary rotor blades (not shown) that are rotatable around their associated secondary rotor axes 21A, 21B. The turbine 1 is arranged in such a way that the secondary rotor axes 21A, 21B are substantially perpendicular to the longitudinal axis 9A, 9B of their associated primary rotor blades 3A, 3B. The secondary rotor axes 21A, 21B are furthermore perpendicular to primary rotor axis 11. In other words, the secondary rotor axes 21A, 21B coincide with the rotation direction of the free outer end of the primary rotor blades 3A, 3B, and as such the secondary rotors 17A, 17B face a rotation direction of the primary rotor 3. Accordingly, the primary rotor 3 is driven by the fluid flow, whereas the secondary rotors 17A, 17B are driven by the relative movement of the secondary rotors 17A, 17B in the fluid induced by a rotation of the primary rotor blades 3A, 3B around the primary rotor axis. Being positioned near the free outer end 7A, 7B of the primary rotor blades 3A, 3B, the secondary rotors 17A, 17B are moved through the fluid at a velocity that is significantly higher than the fluid flow velocity. For example, the turbine 1 may be operated at a speed ratio $\lambda<6$, for example $2\leq\lambda\leq5$, wherein the velocity of the free outer end of the primary rotor blades 3A, 3B is about two to five times higher than the fluid flow velocity, for example three times higher. The secondary rotors 17A, 17B are further much smaller than the primary rotor 3, such that the secondary rotors 17A, 17B can operate at high rotor speeds.

The secondary rotors 17A, 17B are each coupled to a respective electric generator, wherein rotational energy of the secondary rotors are converted into usable electric energy. The electric generator may be associated with a central hub of the respective secondary rotors 17A, 17B, or with a duct 23A, 23B that extends around the respective secondary rotors 17A, 17B such as a ring generator which is integrated with ducts 23A, 23B. Due to the high rotational frequency of the secondary rotors 17A, 17B, the coupling with their associated electric generators may be direct, i.e. without interposition of a mechanical transmission.

The turbine 1 is further arranged in such a way that the secondary rotors 17A, 17B are positioned offset from the longitudinal axis 9A, 9B of their associated primary rotor blade 3A, 3B. In particular, the secondary rotors 17A, 17B are positioned offset from the longitudinal axis 9A, 9B upstream from the longitudinal axis 9A, 9B.

Figure 2A:
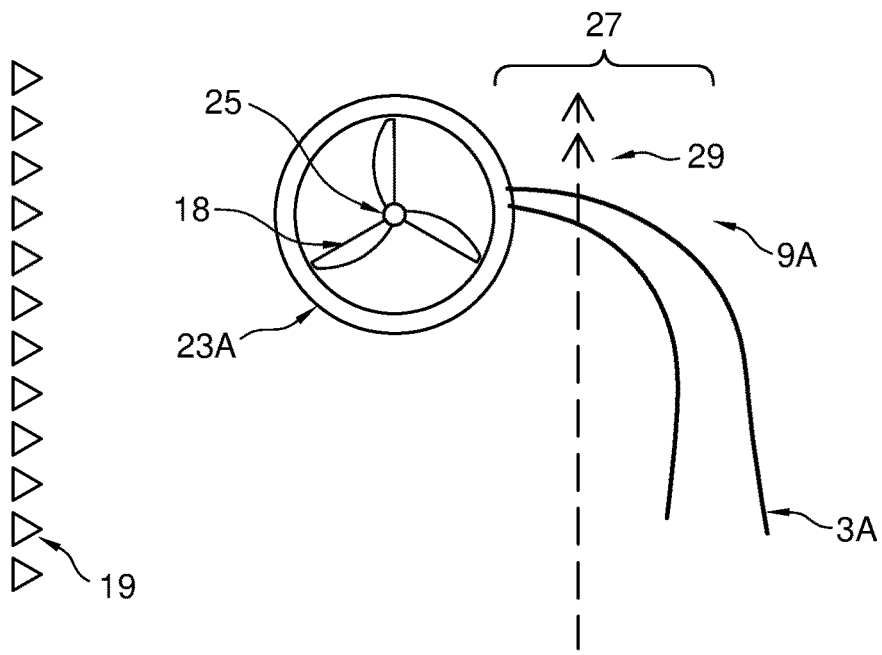
FIG. 2A shows a schematic close up frontal view of a primary rotor blade tip.
Figure 2B:
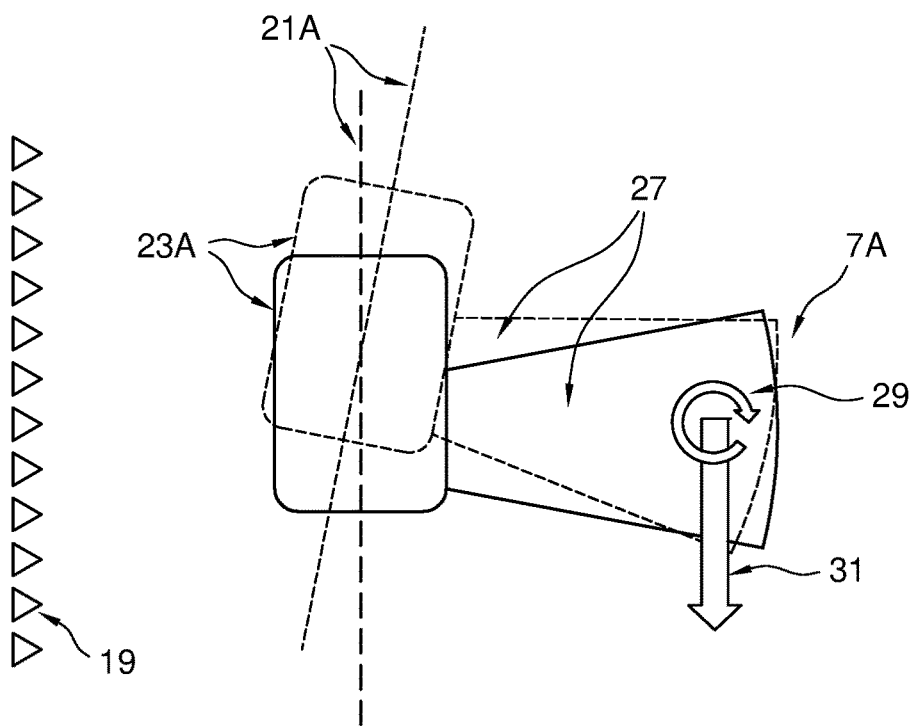
FIG. 2B shows a schematic close up top view of a primary rotor blade tip.

FIGS. 2A and 2B show a free outer end 7A of a primary rotor blade 3A in close up, wherein FIG. 2A shows a side view of the free outer end 7A, and FIG. 2B shows a top view of the free outer end 7A. The primary rotor blade 3A is, at the tip thereof, provided with a secondary rotor 17A. The secondary rotor 17A comprises at least one secondary rotor blade 18 that is rotatable around a secondary rotor axis 21A. Here the secondary rotor 17A comprises three secondary rotor blades, but it will be appreciated that the secondary rotor 17A comprises two, or more than three, such as four five, six or seven secondary rotor blades. The secondary rotor blade 18 is mounted to a secondary rotor hub 25 and extends radially between the secondary rotor hub 25 and an inner wall of the secondary rotor duct 23A. Here, a stator of an electric generator is integrated with the duct 23A, and a rotor of the generator is associated with the secondary rotor 17A. In particular, the inner wall of the duct 23A is coupled to the secondary rotor blades, and rotatable relative to an outer wall of the duct 23A, wherein the rotor of the generator is associated with the rotatable inner wall of the duct 23A. It is appreciated that the secondary rotor may be hub-less, wherein the secondary rotor blades extend, from the inner wall of the duct 23A, radially inwards towards the secondary rotor axis. It is further appreciated that, in an alternative configuration, the stator of the electric generator can be integrated with the hub 25 of the secondary rotor 17A.

The secondary rotor 17A is provided in a through flow channel of the secondary rotor duct 23A, wherein the duct 23A is arranged to direct a flow of fluid in a direction substantially along the secondary rotor axis 21A. The secondary rotor duct 23A is mounted to the free outer end 7A of the primary rotor blade 3A, wherein the free outer end 7A comprises a bridging section 27 that extends in a direction substantially transverse to the longitudinal axis 9A of the primary rotor blade 3A. In particular, the bridging section extends in a direction upstream of the primary rotor plane 4, so as to position the secondary rotor 7A offset from the longitudinal axis 9A of the primary rotor blade 7A. The fluid flow acting on the primary rotor blade 3A causes the primary rotor blade 3A to rotate around the primary rotor axis 11, and accordingly, the outer end 7A of the primary rotor blade 3A will move the direction of the arrow 31 as shown in FIG. 2B. The secondary rotor thrust, induced by the rotation of the primary rotor blade 7A around the primary rotor axis, creates a torsional moment on the primary rotor blade 7A around the longitudinal axis 9A, as indicated by the double arrow 29 in FIG. 2A and the curved arrow 29 in FIG. 2B. Consequently, the primary rotor blade, or a portion thereof, 3A may pivot and/or twist, thereby altering its pitch angle, so as to reduce the loads on the primary rotor blade 7A. The twisted position of the primary rotor blade 7A is indicated in FIG. 2B by the dashed lines.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A turbine comprising a primary rotor, for positioning in a fluid flow, having a primary rotor blade rotatable around a primary rotor axis under influence of the fluid flow acting on the primary rotor blade and extending from the primary rotor axis along a longitudinal axis to a free outer end of the primary rotor blade, wherein the primary rotor blade is provided near the free outer end with a secondary rotor, the secondary rotor having a secondary rotor blade rotatable around a secondary rotor axis, said secondary rotor axis is transverse to the longitudinal axis of the primary rotor blade and to the primary rotor axis, wherein the secondary rotor axis is positioned offset from the longitudinal axis of the primary rotor blade and wherein the primary rotor blade is configured to one or more of pivot or twist, about the longitudinal axis of the primary rotor blade, under influence of a thrust force of the secondary rotor acting on the primary rotor blade.

2. The turbine according to claim 1, wherein the primary rotor blade has an upstream-facing side facing upstream in the fluid flow and a downstream-facing side opposite the upstream-facing side, and wherein the secondary rotor axis is positioned at an offset upstream from the longitudinal axis.

3. The turbine according to claim 1, wherein the secondary rotor is fixedly connected to the primary rotor blade near the free outer end of the primary rotor blade in such a way that the secondary rotor axis rotationally repositions about the longitudinal axis of the primary rotor blade when the primary rotor blade one or more of pivots or twists, to change a yaw angle of the secondary rotor.

4. The turbine according to claim 1, wherein the secondary rotor is arranged at or near a trailing edge of the primary rotor blade.

5. The turbine according to claim 1, wherein the primary rotor blade is configured to twist about the longitudinal axis of the primary rotor blade when the primary rotor blade is subjected to a bending moment about a bending axis.

6. The turbine according to claim 1, wherein the primary rotor blade comprises concrete.

7. The turbine according to claim 6, wherein the concrete is pre-tensioned concrete.

8. The turbine according to claim 1, further comprising control means arranged for controlling a pitch angle about a longitudinal axis of the secondary rotor blade of the secondary rotor.

9. The turbine according to claim 1, wherein the secondary rotor is provided in a duct, wherein the duct comprises a duct wall extending around the secondary rotor axis and a central through flow channel for guiding a flow of fluid through the duct.

10. The turbine according to claim 9, wherein the central through flow channel of the duct comprises a local cross-sectional narrowing or widening between an inlet side and an outlet side of the duct, and wherein the secondary rotor is arranged in the duct at the local cross-sectional narrowing or widening.

11. The turbine according to claim 10, further comprising flow modulation means arranged for changing a cross-sectional area along the central through flow channel of the duct during operation of the turbine.

12. The turbine according to claim 1, wherein the turbine comprises a gearless transmission for converting kinetic energy from the secondary rotor blade to electric energy.

13. An energy converting device for converting kinetic energy from a fluid flow into electrical energy comprising a turbine according to claim 1.

14. The energy converting device according to claim 13, wherein the turbine is an underwater turbine for positioning in a unidirectional stream of water.

15. The energy converting device according to claim 14, wherein the turbine is a tidal turbine for positioning in a stream of water subject to tidal movements.

* * * * *